W. S. MOODY.
HIGH VOLTAGE TRANSFORMER.
APPLICATION FILED JULY 21, 1910.

1,019,512.

Patented Mar. 5, 1912.

Witnesses:
Irving E. Steers.
J. Ellis Glen.

Inventor
Walter S. Moody,
by Albert G. Davis
His Attorney.

UNITED STATES PATENT OFFICE.

WALTER S. MOODY, OF PITTSFIELD, MASSACHUSETTS, ASSIGNOR TO GENERAL ELECTRIC COMPANY, A CORPORATION OF NEW YORK.

HIGH-VOLTAGE TRANSFORMER.

1,019,512.  Specification of Letters Patent.  Patented Mar. 5, 1912.

Application filed July 21, 1910. Serial No. 573,014.

*To all whom it may concern:*

Be it known that I, WALTER S. MOODY, a citizen of the United States, residing at Pittsfield, county of Berkshire, State of Massachusetts, have invented certain new and useful Improvements in High-Voltage Transformers, of which the following is a specification.

This invention relates to electrical transformers in which the secondary winding is required to deliver current of high potential, say from 100,000 to 500,000 volts. In every transformer there is a tendency for the potential to distribute itself unequally along the winding, and in case of a surge of potential on the line, due to switching, short-circuiting or the like, the insulation on the end turns of the transformer is subjected to very abnormal stresses. The danger of short-circuiting one or more coils at such times is especially great in case of a transformer designed for high tension work, and the object of my invention is to obviate this danger by a simple and efficient device. I provide the transformer with one or more metallic plates of considerable surface, electrically connected to the end coil or coils of the windings which it is desirable to protect; this will usually be the high potential winding only. Each plate preferably overlaps the end coil or coils, and if two or more plates are used they are electrically connected. The exposed area of this plate or plates is so great as to effect a decided reduction of potential stress per unit of area and thus relieve the winding and its insulation from undue strain. In event of the potential becoming abnormal, the charge will jump from said plate to the nearby grounded core rather than between adjacent coils. If the winding of the end coil becomes unevenly loaded, so that there is an excessive potential on a few turns, whatever sparking occurs will be between said turns and said plate rather than to adjacent turns, thereby avoiding the short-circuiting of said turns. The plates also afford a convenient means for attaching the line terminals.

Figure 1:
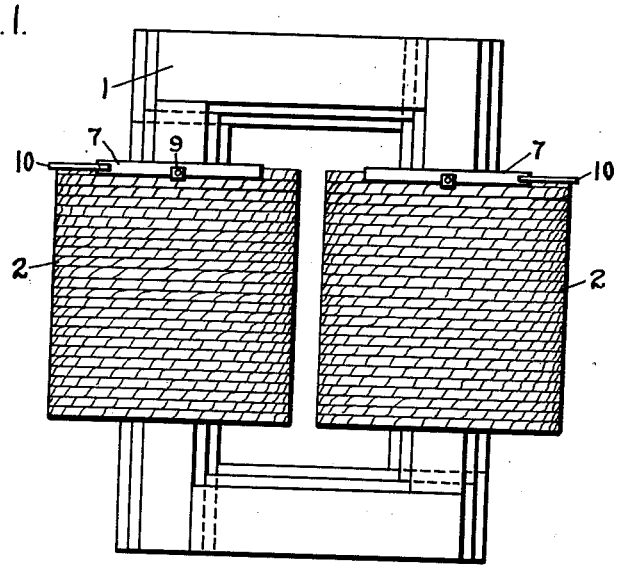
Figure 2:
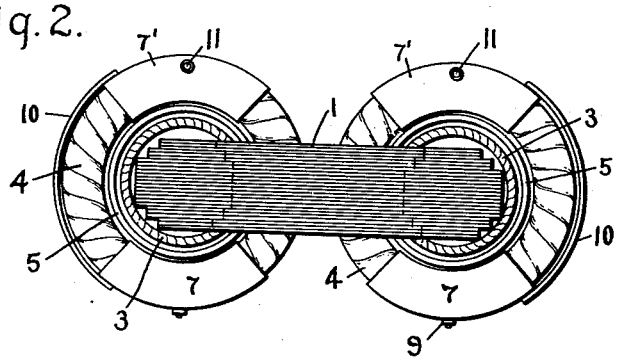
Figure 3:
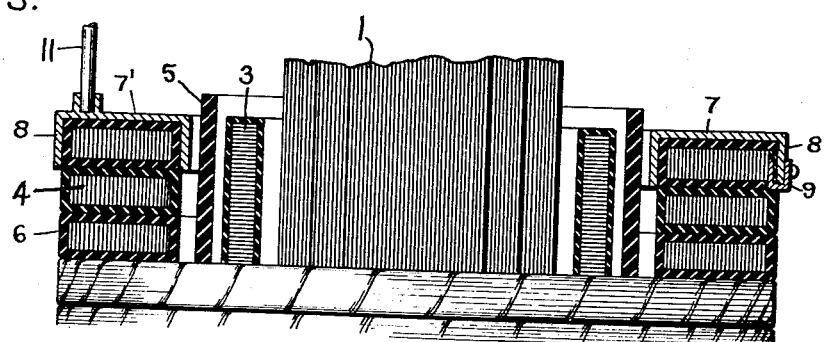

In the accompanying drawing, Figure 1 shows a core-type transformer having two coils provided with my protective end plates; Fig. 2 is a top plan view of the same, and Fig. 3 shows, on a large scale, an elevation, partly in section, of the upper end of one of the coils of said transformer.

The core 1 is of the usual closed circuit laminated construction, and upon each vertical leg it carries a coil 2 composed, as usual, of a low potential winding 3 and a high potential winding 4, concentric with each other and with their leg of the core. A cylindrical barrier 5 of insulating material is interposed between the two windings. The high potential winding is built up of coils, each wrapped in insulation 6. On the upper coil of the tier is applied a metallic plate 7 preferably curved to coincide with the coil, and preferably provided with flanges 8 which fit down over the sides of said coil to retain the plate in place. One end of the conductor comprising said coil is electrically connected with said plate, as by means of the clip 9 soldered or brazed to the conductor and riveted to the flange of the plate.

The area of the exposed surface of the plate 7 is quite considerable, depending of course upon its length. For convenience, it is shown as divided into two parts 7 and 7', connected by a conductor 10. The line terminal 11 is attached to one of said plates, preferably 7'.

With this construction, if an abnormally high potential is impressed upon the secondary winding of the transformer, the end coil thereof will be protected by the extended surface of the plate 7 7', in the manner above set forth. As the core is usually grounded, it affords a ready escape for a lightning charge, which will jump from the plate over the barrier 5.

What I claim as new and desire to secure by Letters Patent of the United States, is:—

1. The combination with a transformer including a winding, of a metallic plate connected to the end turn of the winding.

2. The combination with a transformer including a winding, of a metallic plate of considerable area connected to the end turn of the winding.

3. The combination with a transformer including a winding having separate coils, of a metallic plate of considerable area overlapping the end coil of the winding and connected to one end of said coil.

4. The combination with a transformer including a winding having separate coils, of a metallic plate applied to the end coil of the winding and connected to one end thereof, said plate having flanges fitting down over said coil.

5. The combination with a transformer including a winding, of a metallic plate of considerable area connected to the end of the winding and affording means for the attachment of the line terminal.

In witness whereof, I have hereunto set my hand this 18th day of July, 1910.

WALTER S. MOODY.

Witnesses:
   JAS. O'NEILL,
   P. A. SMITH.